United States Patent [19]
Ramstad

[11] Patent Number: 5,653,259
[45] Date of Patent: Aug. 5, 1997

[54] VALVE BLOCK

[75] Inventor: Paul O. Ramstad, San Jose, Calif.

[73] Assignee: Applied Biosystems, Inc., Foster City, Calif.

[21] Appl. No.: 539,496

[22] Filed: Oct. 6, 1995

Related U.S. Application Data

[63] Continuation of Ser. No. 324,322, Oct. 17, 1994, abandoned.

[51] Int. Cl.$^6$ .................................................. F16K 7/12
[52] U.S. Cl. ........................ 137/606; 137/884; 137/240
[58] Field of Search ................................ 137/884, 606, 137/238, 240, 883; 251/331

[56] References Cited

U.S. PATENT DOCUMENTS

| | | | |
|---|---|---|---|
| 4,008,736 | 2/1977 | Wittmann-Liebold et al. | 137/606 |
| 4,168,724 | 9/1979 | Graffinder et al. | 137/238 X |
| 4,304,257 | 12/1981 | Webster | 137/884 X |
| 4,558,845 | 12/1985 | Humhapiller | 137/884 X |
| 4,703,913 | 11/1987 | Humhapiller | 137/884 X |
| 4,721,133 | 1/1988 | Sundblom | 137/883 |
| 4,848,722 | 7/1989 | Webster | 137/884 X |
| 4,852,851 | 8/1989 | Webster | 137/884 X |
| 4,858,883 | 8/1989 | Webster | 137/884 X |
| 4,943,032 | 7/1990 | Zdeblich | 251/11 |

*Primary Examiner*—John Fox
*Attorney, Agent, or Firm*—Paul D. Grossman; Stephen C. Macevicz; Joseph H. Smith

[57] ABSTRACT

A manifold block and valving system using the manifold block are provided, which are used for conducting chemical reagents, solvents, and other fluids. The manifold block includes a "straight-through" common passage in fluid connection with several entry ports, including also a number of projections in the common passage in the vicinity of the entry ports. These projections partially obstruct the fluid flow, causing a turbulence that provides a washing action in those port regions. The manifold may be constructed of a photosensitive glass ceramic such as Fotoceram™ which consists of a number of layers which have been processed to form the manifold block, or of other suitable materials such as silicon.

6 Claims, 6 Drawing Sheets

VALVE BLOCK

This application is a continuation of application Ser. No. 08/324,322 filed 17 Oct. 1994 now abandoned.

FIELD OF THE INVENTION

The present invention is in the area of manifolded valve blocks for controlling multiple fluid flows, and has particular application in apparatus for performing automated processes in preparative and analytical biochemistry.

BACKGROUND OF THE INVENTION

Equipment for facilitating research and performing production processes in biochemical related industries is part of a rapidly expanding marketplace. Conducting chemical reagents, solvents, and other fluids, often in small conduits and tubings and at low flow rates under low pressure, is often required in such equipment, and there is a need for valves that can be remotely actuated for automatic control. There is also a need for such valving to be manifolded so a number of different fluids may be switched into various lines to and from reaction chambers and the like. To be useful in the industry (particularly where there is direct contact with samples for analysis and other fluids used in the chemical processes), it is necessary that the materials for such manifolds and valves be inert to the fluids used, which are quite varied. Examples of equipment of this nature are the protein sequencers and DNA synthesizers marketed by Applied Biosystems Inc. of Foster City Calif.; some of these systems are shown in the following publications of Applied Biosystems Inc.: 430A Service Manual, 340A Service Manual, 380A Service Manual, and 470A Service Manual.

A particular apparatus of this kind is also shown in U.S. Pat. No. 4,603,114 "Method for the Sequential Performance of Chemical Processes" issues to Hood et. al. on Jul. 29, 1986. FIG. 12 of the Hood Patent illustrates a prior art manifold in which a common passage of a "sawtooth" shape is formed in the manifold block by drilling eight separate holes at angles through the thickness of the block, the separate holes coming together at openings in the top of the manifold. Each opening is positioned adjacent an input opening from a fluid source and beneath a diaphragm which will serve to valve fluid from the associated source into the common passage.

A similar arrangement is shown in U.S. Pat. No. 4,008,736 "Valve Arrangement for Distributing Fluids" issued on Feb. 22, 1037 to Wittman-Liebold et. al.

The "sawtooth" design of the common fluid passage which is evident in all of these references was utilized (in part) to solve a problem in earlier valves, in which the common passage was of a "straight-through" nature, having short sections extending perpendicularly to the common passage, in the regions below the various fluid sources. More particularly, it was found in these straight-through designs that normal cleaning cycles did not sufficiently clean the perpendicular sections, leaving undesirable residues. The sawtooth design corrected this problem, but introduced new complexities, including unsuitability for use with valve blocks of multilayer ceramic construction.

SUMMARY OF THE INVENTION

In accordance with the illustrated preferred embodiments, the present invention provides a manifold block of a unique design, which is used in a valving system for conducting chemical reagents, solvents, and other fluids, often in small conduits and tubings and at low flow rates under low pressure. The manifold block includes a "straight-through" common passage in fluid connection with several entry ports to the common passage. In accordance with aspects of the invention the common passage is interrupted by several projections in the vicinity of the entry ports, which partially obstruct the fluid flow, causing a turbulence that provides a washing action in those port regions. This provides for a thorough cleansing of those regions during a cleansing cycle, making the use of a straight-through common passage possible in high precision systems.

In accordance with other aspects of the invention, the manifold is constructed of a photosensitive glass ceramic such as Fotoceram™, which consists of a number of layers which have been processed to form the manifold block. In this preferred embodiment, the straight-through common passage and the projections are formed in one of the layers of the ceramic.

In accordance with yet other aspects of the invention, the manifold is constructed of a number of layers of silicon which have been processed to form the manifold block.

In accordance with yet other aspects of the invention, a solenoid operated valve block apparatus is provided which includes a solenoid assembly; the above described manifold block having a surface adjacent to the solenoid assembly, with a pair of openings in the block adjacent to the solenoid assembly; and a seal membrane over the openings on the surface. One of the openings is in fluid connection with a source of liquid, such as a chemical reagent, while the other opening is in fluid connection with the common passage in the manifold block. In operation the seal membrane is urged by the solenoid assembly to press on the surface to stop fluid flow under the membrane between the openings, thereby serving as a valve to permit or prevent fluid flow into the common passage in the manifold block.

DESCRIPTION OF THE PREFERRED EMBODIMENTS

Figure 1:
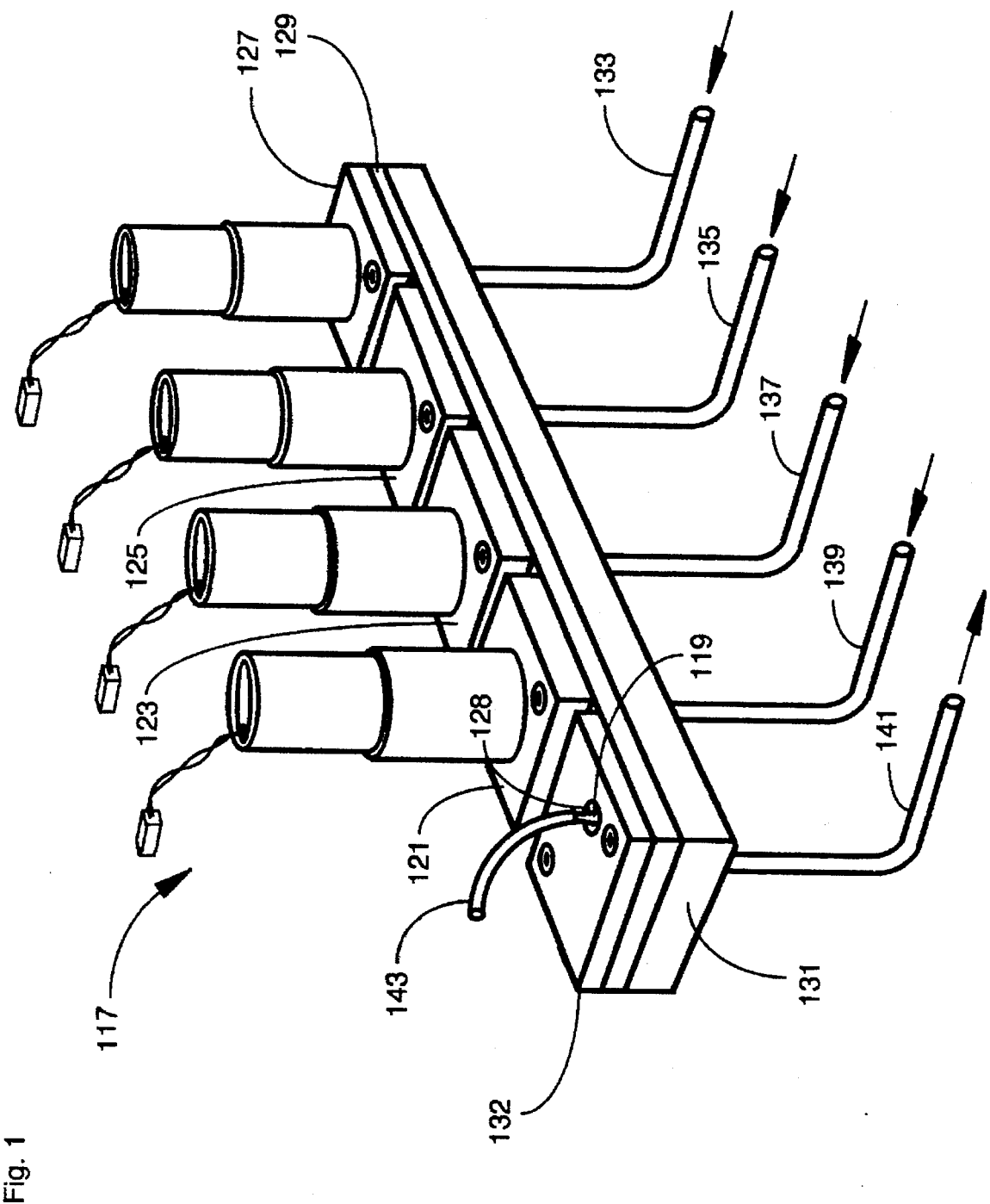
FIG. 1 is a perspective view of a solenoid valve block assembly in accordance with aspects of the invention.

FIG. 1 is a perspective view of a valve block 117 according to a preferred embodiment of the invention. Similar to the arrangement shown in the publications of Applied Biosystems referred to above, there are four solenoid assemblies 121, 123, 125 and 127, one each for each of four incoming lines 139, 137, 135 and 133 respectively. A passive block 132 is used at the position of outgoing line 141 to spread the pressure of the screws at assembly. Unlike those systems, however, a manifold block 129 made of Fotoceram™, a photosensitive glass ceramic, is sandwiched between the solenoid assemblies and a lower metal block 131. The construction of the Fotoceram manifold is described in detail below in connection with FIG. 7. A vacuum manifold is internal to manifold block 129, and vacuum supply is by tubing 143 connecting to a nipple 119 on manifold block 129. A hole 128 through block 132 provides clearance for nipple 119 and tubing 143.

Figure 2:
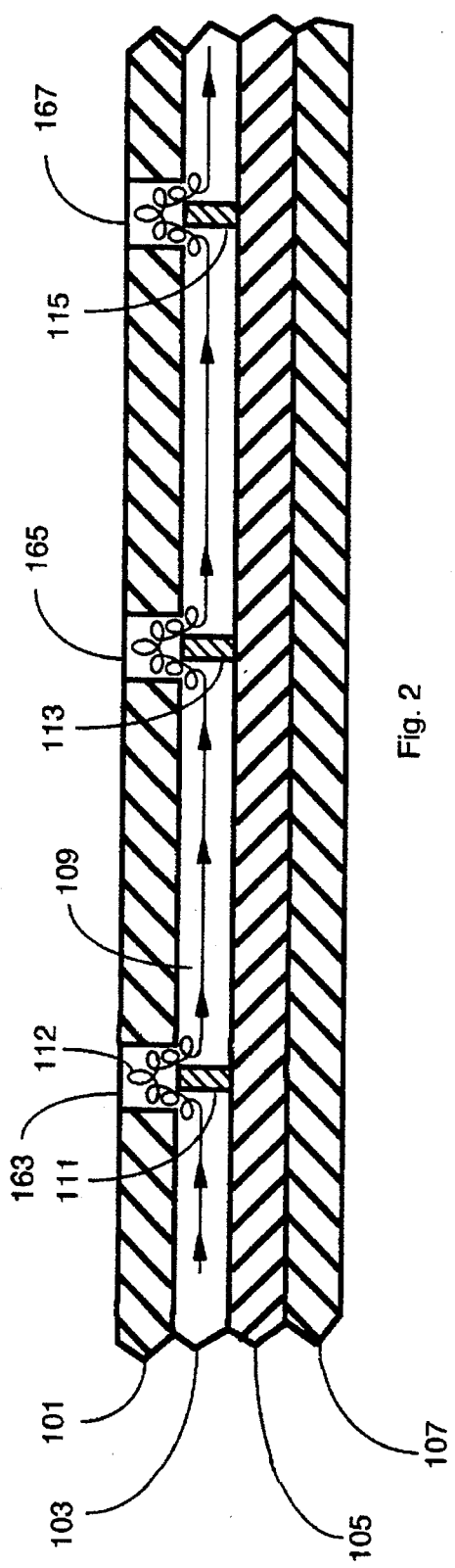
FIG. 2 is a cross sectional view of a manifold block illustrated in FIG. 2.

FIG. 2 is a cross sectional view of a portion of the Fotoceram manifold block 129, taken along the line "A—A" shown in FIG. 3 (some details of construction are omitted in FIG. 2 for clarity; these are shown and described in later figures). FIG. 2 shows four ceramic layers 101, 103, 105, and 107, each layer being in the range of 0.025" to 0.055" high by 0.9" wide. The length of the block is 0.75" for each valve (three valves being shown in FIG. 2 and four valves in FIG. 4) plus an additional 0.75". The top surface of layer 101 is a sealing surface adjacent the bottom of solenoid assemblies 121, 123, 125, and 127 (FIG. 1). Manifold block 129 includes a common passage which is very unlike the angled passage of the prior art manifolds shown in Hood and the other references mentioned above. Instead, layer 103 is etched to provide a "straight-through" common passage 109, substantially parallel to the sealing surface of layer 101, somewhat like the straight-through passages of some prior art devices. However, in accordance with aspects of the present invention, common passage 109 is interrupted by several projections 111, 113, and 115. These are positioned below ports 163, 165, and 167 which are etched in top layer 101. Projections 111, 113, and 115 are preferably equal in height to the layer height and about 0.005" to 0.020" along the channel dimension. Preferably, the projections extend across the width of the channel, but may be somewhat smaller and still function adequately.

Figure 3:
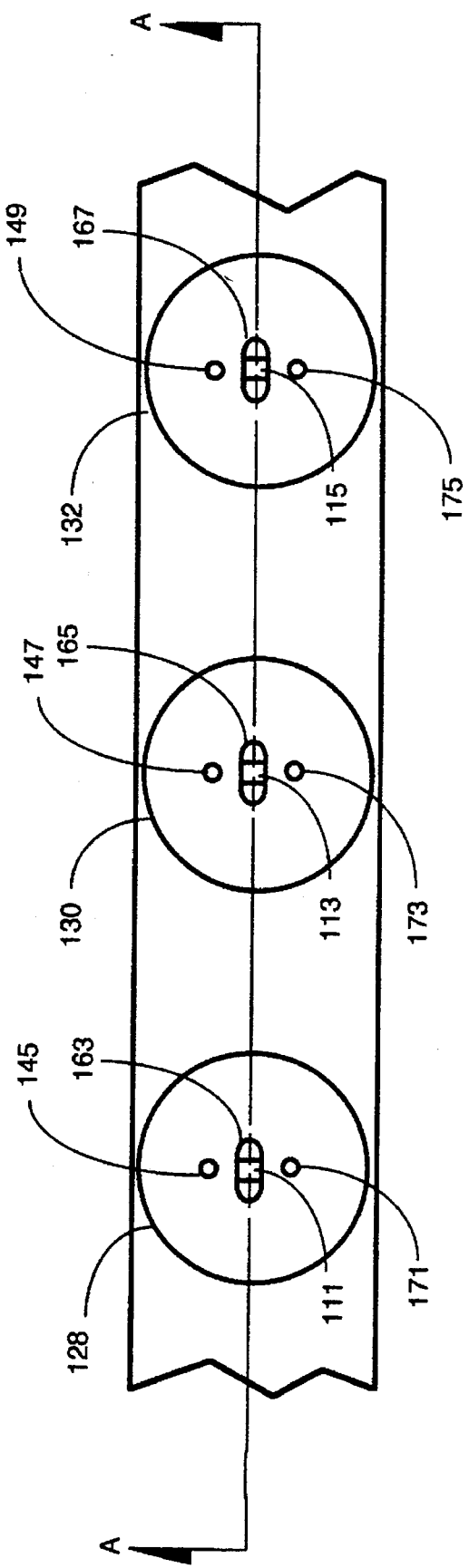
FIG. 3 is a top view of the manifold block in accordance with aspects of the invention.

FIG. 3 is a top view of manifold 129, showing ports 163, 165, and 167 from above, so that projections 111, 113, and 115 are visible. Three other ports 145, 147, and 149 are in fluid connection with three chemical sources, bringing the associated chemicals to the surface of manifold 129. Three large areas 128, 130, and 132, enclose the surface area covered by the diaphragm at the end of three solenoids (not shown) which serve to activate this valve system, all as described above, in the prior art publications from Applied Biosystems Inc.

Referring again to FIG. 2, it can be seen that if the projections 111, 113, and 115 were not present in channel 109, then fluid flowing directly through the straight channel would tend to pass smoothly beneath ports 163, 165, and 167. This kind of smooth flow presents a problem in the cleaning of the apparatus, which is typically accomplished by forcing cleaning fluids through the fluidic channels. Specifically, in a straight-through channel without the projections, the vertical tubular portions comprising ports 163, 165, and 167 will not be well cleaned, since the cleaning fluids tend to pass smoothly beneath those regions.

However, in a device constructed in accordance with the preferred embodiments of the invention, projections 111, 113, and 115 serve to partially obstruct the flow, causing a turbulence that provides a washing action in those port regions, thereby providing a thorough cleansing. This washing action is schematically illustrated in FIG. 2 by the turbulent fluid flow 112 in port 163.

Figure 4:
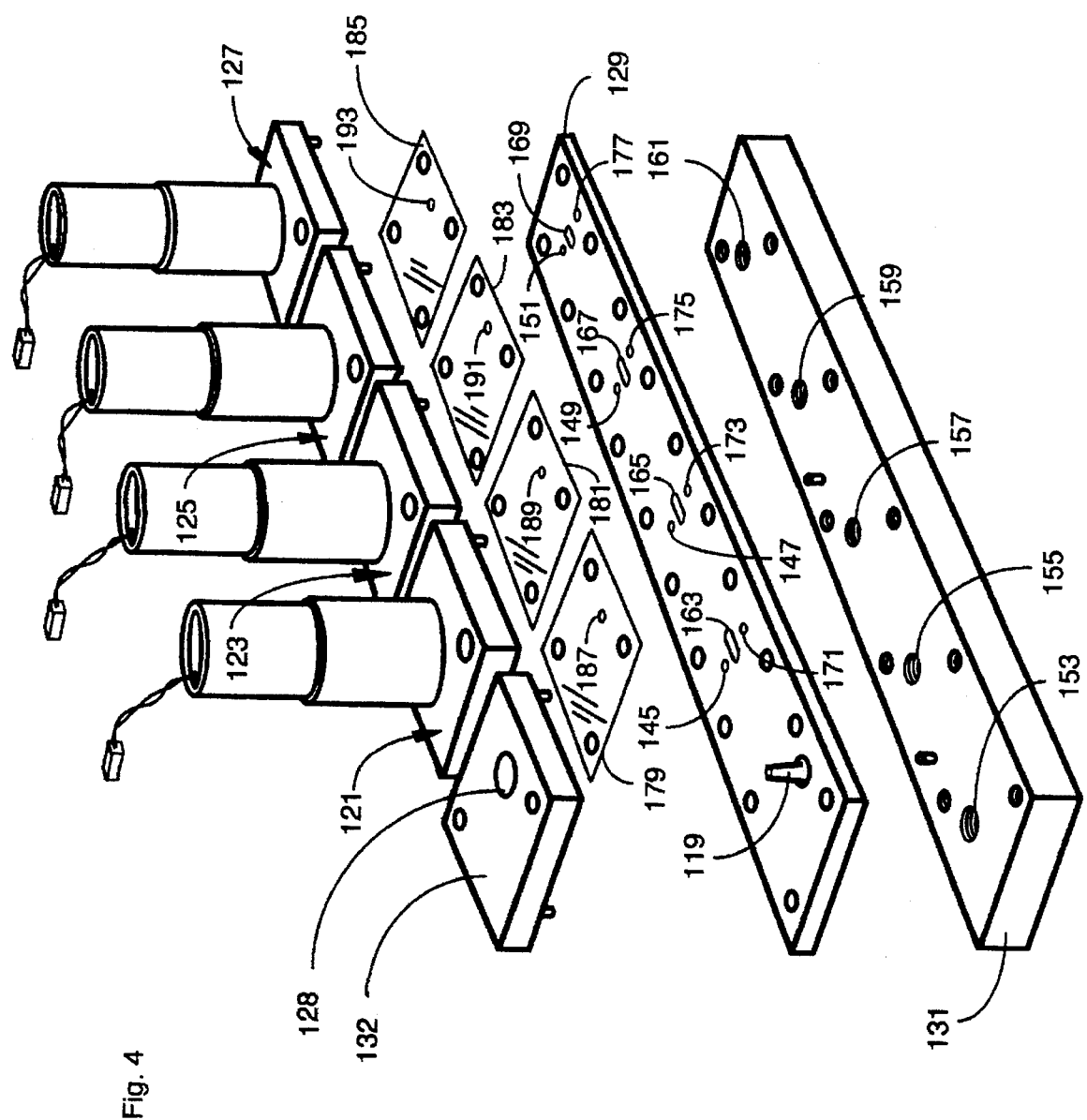
FIG. 4 is an exploded view of portions of a valving system in accordance with aspects of the invention.

FIG. 4 is an exploded view showing more detail of the construction of valve block 117. Openings 171, 173, 175 and 177 in the manifold block enter a common vacuum passage within the block that is also connected to nipple 119. Membranes 179, 181, 183 and 185 each have a hole, 187, 189, 191 and 193 respectively, that align in assembly with passages 171, 173, 175 and 177, and with holes (not shown) in each of the solenoid assemblies, conducting vacuum from the common vacuum passage in manifold block 129 to the topside of each of the plastic membranes to aid in opening each of the valves.

Openings 163, 165, 167 and 169 in the manifold block connect to the common passage within the manifold block that also connects to an opening underneath the manifold block that aligns with threaded passage 153 in lower block 131, which in turn connects to outgoing line 141 (FIG. 1). Vertical passages 145, 147, 149 and 151 pass through the Fotoceram™ manifold block and align with threaded passages 155, 157, 159 and 161 respectively. These in turn connect to incoming lines 139, 137, 135 and 133 respectively. A retracted solenoid plunger at any of the four solenoid assemblies opens flow between the incoming line at that position and the common manifold. For example, if the plunger for solenoid assembly 125 is retracted, flow of fluid may pass from incoming line 135 (FIG. 1) though threaded passage 159, vertical passage 149, across and into opening 167 to the common passage, and thence to threaded passage 153 and outgoing line 141 (FIG. 1).

Figure 5:
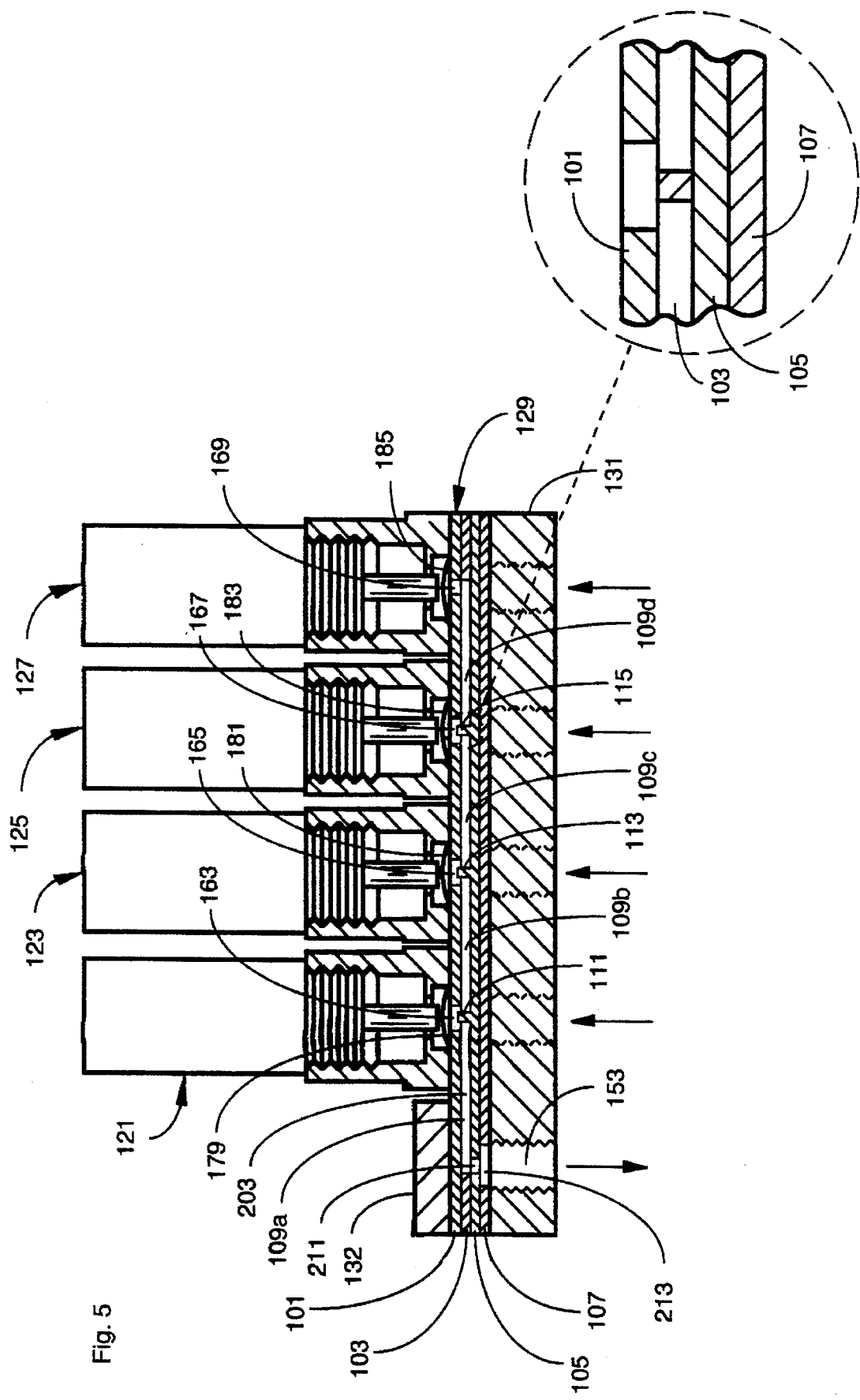
FIG. 5 is a cross sectional view of the valving system illustrated in FIG. 4.

FIG. 5 is a vertical section of the Glass-ceramic valve block of FIG. 1 along a line passing through each of openings 163, 165, 167 and 169. Glass-ceramic manifold block 129 is made up of four layers 101, 103, 105, and 107. Passages 163, 165, 167 and 169 pass through uppermost layer 101 and these passages align with a segmented slot 109. The segmentation of slot 109 is provided by projections labeled 111, 113, and 115 incorporated within layer 103, which separate four slot portions 109a, 109b, 109c, and 109d. Slot 109 forms the common fluid passage for the manifold block when the layers are placed together. As described above in connection with FIG. 2, the projections help control the flow of fluids in the common fluid passage at openings 163, 165 and 167, causing a turbulence that provides a washing action under the plastic shut-off membranes, thereby aiding in washing and cleaning of the valve block.

Layer 105 has vertical passages to align with holes in layer 107 (not shown) and with each of the threaded passages of lower block 131. Although not shown in FIG. 5, in the preferred embodiment there are two concentric o-rings in grooves under each of the solenoid assemblies above the plastic membranes to aid in sealing the components of the assembly to prevent leakage. One o-ring encircles the area of each inlet vertical passage and the associated common passage opening, such as opening 163 and vertical passage 145, and the other is concentric with the first and large enough that each vacuum opening, such as opening 171, is between the two o-rings. Also in FIG. 5 passage 109 is shown connecting each of openings 163, 165, 167 and 169, and extending on to an opening 211 through layer 105 and an opening 213 through layer 107 to connect with threaded passage 153 through the lower block. Actually, in the preferred embodiment, the threaded passages through the lower block are all in a straight line, offset from a line passing through the common passage openings, and passage groove 109 in layer 105 is angled a small amount from the position of solenoid assembly 121 to the position of threaded passage 153 to make up the difference.

Figure 6:
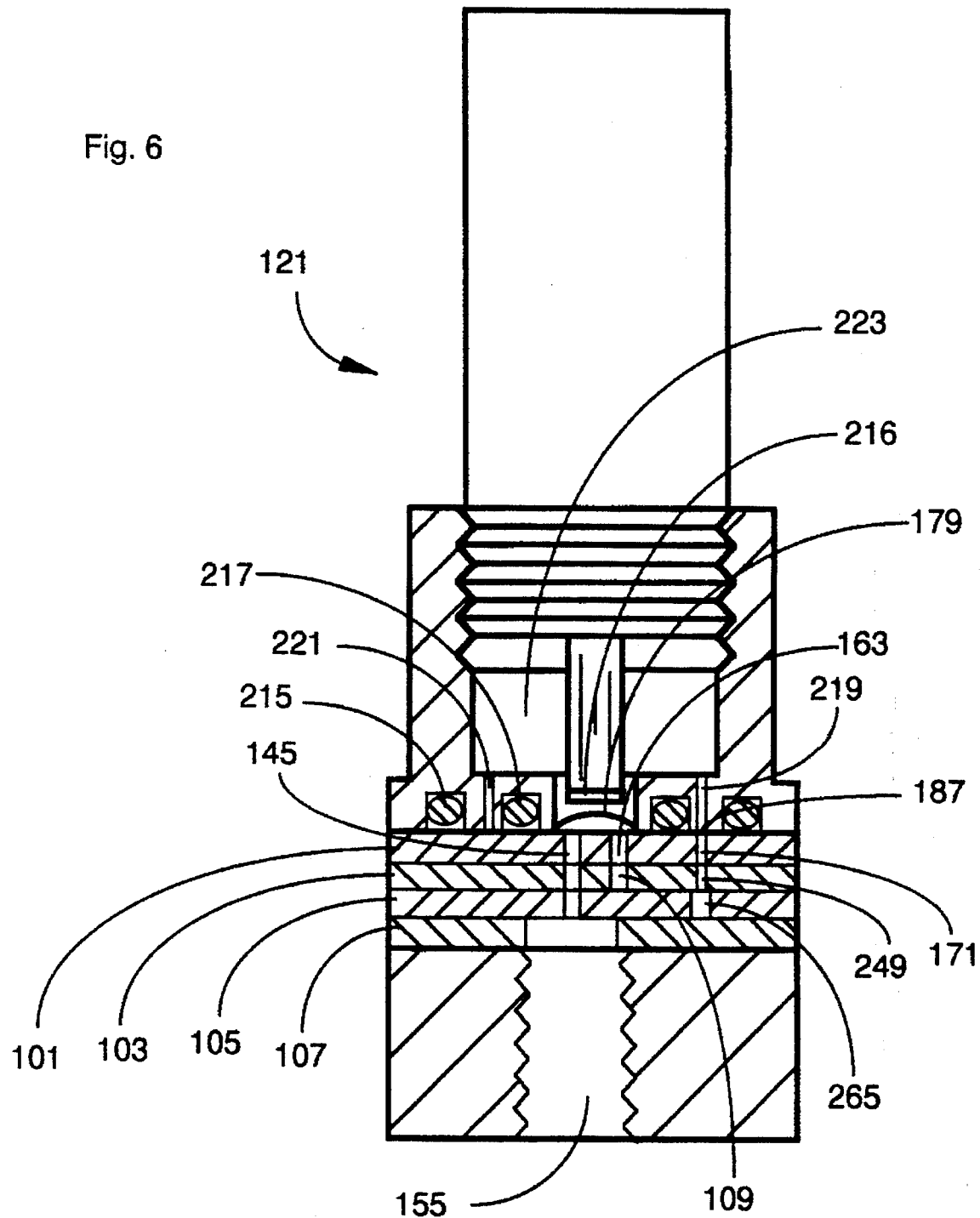
FIG. 6 is a cross sectional view of one of the valves shown in FIG. 5.

FIG. 6 is a section through valve block 117 at the center of solenoid assembly 121 and at right angles to the section of FIG. 5 to show the two o-rings and additional details. O-rings 215 and 217 in grooves in the base of solenoid assembly 121 aid in forming fluid-tight seals, and the block has two holes 221 and 219 that penetrate to cavity 223 above membrane 179. A passage 187 through membrane 179 and verticle passage 171 and 249 through layers 101 and 103, respectively, of the glass-ceramic manifold aligns in assembly with hole 219, and a groove 265 in layer 105 of the glass-ceramic manifold forms the common vacuum passage in the manifold block just as passage 109 forms the common fluid passage. The two holes provided into cavity 223 are to render the solenoid assembly symmetric so it may be assembled in either of two ways. Diaphragm 179 has two corresponding holes for the same reason.

Figure 7:
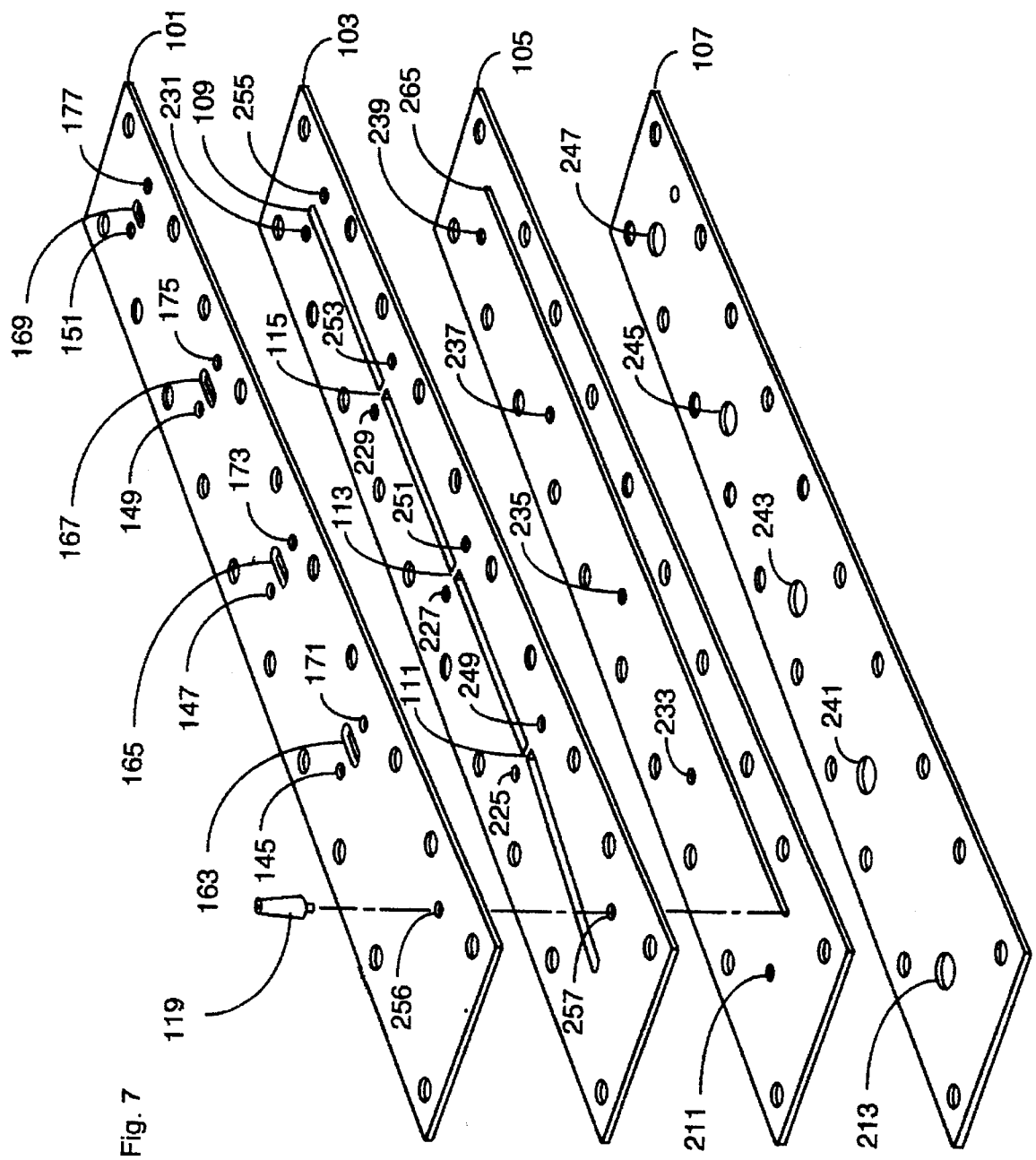
FIG. 7 is an exploded view of the manifold block shown in FIG. 2, showing more detail of the construction.

FIG. 7 is an exploded view of Glass-ceramic manifold 129 showing in more detail the four layers separated to better illustrate the geometry of passages formed into each layer before the layers are joined. Nipple 119 fits into hole 256 through layer 101 and is typically cemented in place with an epoxy adhesive. Hole 256 aligns with hole 257 through layer 103, and hole 257 aligns with one end of slot 265 in layer 105. Slot 265 in layer 105 becomes the common vacuum manifold after the layers are assembled. From the common vacuum manifold, vacuum is applied through holes 249 and 171 to solenoid assembly 121 (FIG. 4), through holes 251 and 173 to solenoid assembly 123, through holes 253 and 175 to solenoid assembly 125, and through holes 255 and 177 to solenoid assembly 127.

Slot 109 in layer 103 forms the common fluid manifold, and aligns with opening 163 through layer 101 to serve solenoid assembly 121, opening 165 to serve solenoid assembly 123, opening 167 to serve solenoid assembly 125, and with opening 169 to serve solenoid assembly 127. One end of the common fluid manifold aligns with hole 211 through layer 105 which in turn aligns with hole 213 through layer 107, which aligns with threaded opening 153 in assembly (FIG. 4). Threaded opening 153 is the opening for the outgoing line. Projections 111, 113 and 115 on layer 103 separate the segments of slot 109 (the common fluid manifold), at openings 163, 165, 167 and 169 to provide turbulence in flow for washing the openings and the membrane undersurfaces.

Incoming line 139 (FIG. 1) to solenoid assembly 121 connects through threaded passage 155 and holes 241, 233, 225, and 145. Similarly, threaded passage 157 connects through holes 243, 235, 227 and 147; threaded passage 159 connects through holes 245, 237, 229, and 149; and threaded passage 161 connects through holes 247, 239, 231, and 151.

The Glass-ceramic manifold in the preferred embodiment is manufactured from photochemically machinable glass in a process fully described in a paper "Precision Photochemical Machining of a Glass Without Photoresist", presented at the National Electronic Packaging and Production Conference on Feb. 26, 1986 in Anaheim, Calif. The paper is by Roger K. Whitney of Corning Glass Works, Corning, N.Y., and is incorporated by reference.

In the manufacturing process separate sheets of lithium silicate glass (which become the layers described above) are exposed to ultraviolet radiation through photomasks cut to the desired machining pattern, followed by a heat treatment. An opal image is formed through the entire thickness of the glass, and the image is subsequently chemically machined in a hydrofluoric acid solution. Glass sheets can be lapped after chemical machining to insure flat surfaces. Secondary ultraviolet exposure and heat treatment converts the glass to a glass-ceramic material called Fotoceram™. In the conversion process, the separate layers are precisely stacked together, and after firing are fused into a monolithic structure. It is the ability to fuse the separately machined sheets that allows the construction of intricate manifolds with very small passages as described above.

The Glass-ceramic manifold described in the preferred embodiment is but one of a very large number of manifolds for solenoid operated valve blocks that may be provided. The embodiments are limited only by the requirements for fluid flow. For example, silicon may be used for the various layers in lieu of the glass-ceramic described herein. Glass-ceramic manifolds are manufactured presently for from one to twelve solenoid assemblies, but future embodiments could have even more solenoid valves. It will be apparent to a person skilled in the art that there are many changes that might be made without departing from the spirit and scope of the invention. Dimensions might vary widely for the various holes and passages, projections and the like. Especially in the case of silicon layers, the entire size of the apparatus may be significantly reduced. Such changes among others are to be considered within the spirit and scope of the invention.

What is claimed is:

1. A valve system comprising:
   a manifold block;
   a plurality of sealing valves at one surface of said manifold block;
   a common passage buried in said manifold block away from said one surface;
   a plurality of entry ports extending from said surface of said manifold block into said manifold, one end of each entry port being in fluid connection with a corresponding one of said sealing valves, the other end of said entry port being in fluid connection with the common passage at a juncture; and
   a projection positioned in the common passage at the juncture of the common passage and at least one of said entry ports for directing the flow of said fluid from the common passage into the entry port and then back into the common passage, said flow being sufficient to wash said entry port.

2. The valve system as in claim 1 wherein said flow interrupting means comprises a physical projection blocking a portion of said common passage at said juncture of said common passage and said entry port.

3. A valve system as in claim 2 wherein:
   said manifold block comprises a plurality of layers, at least some of said layers being composed of photochemically machinable glass material, at least one of said layers having a pattern of openings forming said common passage, said plurality of entry ports, and said flow interrupting means, when said layers are stacked and fused to form said manifold block.

4. The valve system as in claim 1 further comprising vacuum manifold means integral to said manifold block, for conducting a vacuum through said manifold block.

5. A valve system as in claim 4 wherein said vacuum manifold means comprises a vacuum passage buried in said block.

6. The valve system as in claim 1 wherein:
   said manifold block comprises a plurality of layers, at least some of said layers being composed of silicon, at least one of said layers having a pattern of openings forming said common passage, said plurality of entry ports, and said flow interrupting means, when said layers are stacked and fused to form said manifold block.

* * * * *